UNITED STATES PATENT OFFICE.

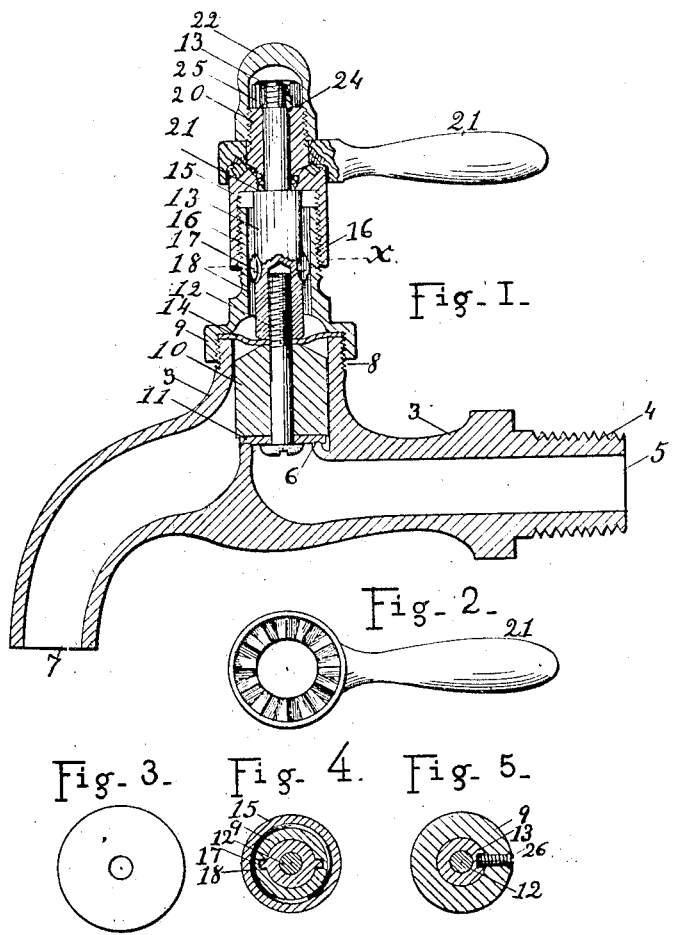

JOSEPH E. VAN NOSTRAN, OF UPPER SANDUSKY, OHIO, ASSIGNOR OF ONE-HALF TO J. W. JOHNSON.

STOP-COCK.

No. 926,827.    Specification of Letters Patent.    Patented June 29, 1909.

Application filed December 15, 1908. Serial No. 467,658.

*To all whom it may concern:*

Be it known that I, JOSEPH E. VAN NOSTRAN, a citizen of the United States, residing at Upper Sandusky, in the county of Wyandot and State of Ohio, have invented new and useful Improvements in Stop-Cocks, of which the following is a specification.

This invention relates to cocks and faucets, and its object is, first, to adapt a faucet to be opened and closed by positive movements so that the same faucet will serve equally well whether the water pressure be light or heavy; second, to provide means to prevent leaking at both the fixed and movable joints; third, to provide means for reducing to a minimum the wear on the valve; and fourth, to adapt a turning lever or handle for circumferential adjustment so that when normally at rest when the valve is closed it will be pointing backward out of the way.

To this end my invention consists in the construction and combination of parts forming a stop-cock hereinafter more fully described, and particularly set forth in the claims, reference being had to the accompanying drawings, in which—

Figure 1 represents a stop-cock according to my invention, in longitudinal, vertical section, partly in side elevation. Fig. 2 represents the handle inverted. Fig. 3 is a face view of the rubber packing-disk. Fig. 4 shows a horizontal section at x Fig. 1. Fig. 5 corresponds with Fig. 4 but shows a modification.

Numeral 3 represents the body of the stop-cock having a screw thread 4, to connect it with a supply pipe in the usual manner; an entrance passage 5; a valve seat 6; a discharge outlet 7, and a threaded neck 8, to receive a cap 9.

A valve 10, is provided with a packing washer 11, secured to its lower end by a screw 12. This screw further serves to secure the stem 13, to the valve, and to bind between the valve and stem a disk 14. This disk is made of elastic material such as soft rubber, and is rigidly secured at its outer edge between the cap 9, and body 3, and its central portion bends up and down to accommodate the movements of the valve in opening and closing, but it remains fixed as a tight packing between the valve and stem and between the cap and body.

A thimble 15, is screw-threaded at 16 upon the cap 9, and is fitted to revolve freely around the reduced neck of the valve stem 13, between shoulders 23 and 24 thereon, to carry the valve up and down. The shoulder 24, is formed by screwing or riveting a nut 25, on to the valve rod. Lugs 17, projecting from the sides of the valve-stem 13, are fitted to slide up and down in grooves 18, in the cap 9, to prevent the stem from being rotated by the thimble in service; thereby preventing the valve washer 11, from being ground away as it would be if rotated when under pressure on the valve seat; and preventing the valve stem from wearing a leak through the disk 14, as it would do if permitted to rotate when bound thereto.

The thimble 15, is provided with a screw extension 20, which passes through the head of the handle 21, and a nut 22, threaded upon the screw 20, binds the handle to the thimble. The thimble and handle are radially corrugated in their adjacent faces; the corrugations registering together hold the thimble to be turned by the handle when the nut 22, is turned home, and yet, when the nut is turned up a little the handle is set free to be rotated to any desired radial position upon the thimble where it may be fastened by turning home the nut. By turning the handle to screw the thimble downward upon the cap thread 16, the thimble will carry with it the stem 13, and valve 10, closing the valve. The reverse movement of the handle positively opens the valve against any amount of water pressure. The disk 14, secures tight joints around the valve-stem and cap whether the stop-cock be used for air, steam, water or other fluid.

The thimble 15, acting between shoulders on the valve-stem, renders the movement of the valve positive both ways.

In Fig. 5 the stem 13, is grooved, and a screw 26, tightly set in the cap 9, serves as a lug to keep the stem from rotating with the thimble 15. The result will be the same whether the groove be in the stem or the cap if the corresponding lug be fixed in the other part.

Having thus fully described my invention, what I believe to be new and desire to secure by Letters Patent are the following claims.

1. In stop-cocks, a body having a valve-seat in it; a cap screw-threaded upon the body; a valve fitted to the said seat; a stem for the valve and a screw securing the two together; an elastic disk located between the valve and its stem and between the cap and the body and serving as a packing at both joints; the valve-stem fitted to reciprocate through the cap, one of these parts having one or more slots and the other part having one or more fixed lugs to register therewith; a thimble freely screw-threaded upon the cap and engaging the valve-stem between shoulders thereon, and a handle for the thimble.

2. In stop-cocks, a body having a valve-seat in it; a cap upon the body; a thimble screw-threaded upon the cap and having a screw-threaded extension; a handle freely mounted upon the said extension, the adjacent faces of the handle and thimble having radially corrugated surfaces to register together; a nut screw-threaded upon the said extension over the handle; a valve fitted to the said seat and having a stem with a reduced neck and a shoulder at each end thereof; the said thimble freely fitting the valve-stem neck between the shoulders thereof, substantially as shown and described.

In testimony whereof I affix my signature, in presence of two subscribing witnesses.

JOSEPH E. VAN NOSTRAN.

Witnesses:
 Wm. F. Veith,
 Denver Baker